United States Patent [19]

Fromberg

[11] Patent Number: 4,711,461
[45] Date of Patent: Dec. 8, 1987

[54] THREE-AXIS TRAILER HITCH HAVING IMPROVED ROTATABLE COUPLING BETWEEN VEHICLE AND TRAILER

[75] Inventor: John P. Fromberg, Covina, Calif.

[73] Assignee: Positive Connections, Inc., Pasadena, Calif.

[21] Appl. No.: 853,187

[22] Filed: Apr. 17, 1986

[51] Int. Cl.$^4$ .............................................. B60D 1/00
[52] U.S. Cl. .................... 280/494; 280/504; 403/57
[58] Field of Search ............... 280/492, 493, 494, 204, 280/504; 403/53, 57, 58

[56] References Cited

U.S. PATENT DOCUMENTS

| 2,027,499 | 1/1936 | Tully | 280/492 |
| 2,457,885 | 1/1949 | Gatch | 280/492 X |
| 2,871,030 | 1/1959 | Hollis | 280/492 |
| 3,730,557 | 5/1973 | Cox | 280/492 |
| 3,843,164 | 10/1974 | Flegel | 280/492 |
| 4,200,306 | 4/1980 | Helms | 280/494 |
| 4,548,423 | 10/1985 | Craven | 280/492 |

Primary Examiner—David M. Mitchell
Assistant Examiner—Charles R. Watts
Attorney, Agent, or Firm—B. F. Spencer

[57] ABSTRACT

A trailer hitch is disclosed for providing coupling about three independent axes between a towing vehicle and a trailer. The hitch includes a first U-shaped yoke member having a base plate adapted for attachment to the towing vehicle and having a pair of spaced-apart arms receiving and supporting a first hinge pin extending along a horizontal, transverse axis. A second U-shaped yoke member having a pair of spaced-apart arms supports a second hinge pin about a vertical axis. The first and second U-shaped yoke members are intercoupled by first and second hollow cylindrical sections joined together in the form of a cross, the first hollow cylindrical section being supported upon the first hinge pin and the second cylindrical section being supported upon the second hinge pin to form a universal coupling. First and second short, hollow cylindrical members are mounted, end to end in abutting relationship, upon a hollow, cylindrical sleeve member for relative rotation, one with respect to the other, about a longitudinal axis. The first short, hollow cylindrical member is securely attached to the outside base portion of the second U-shaped yoke member and the second short, hollow cylindrical member is adapted for attachment to the tongue of the trailer. An axial bolt extending between the opposite ends of the first and second short, hollow cylindrical members and through the center of the hollow, cylindrical sleeve member retains the first and second short, hollow cylindrical members in their abutting rotatable relationship.

6 Claims, 3 Drawing Figures

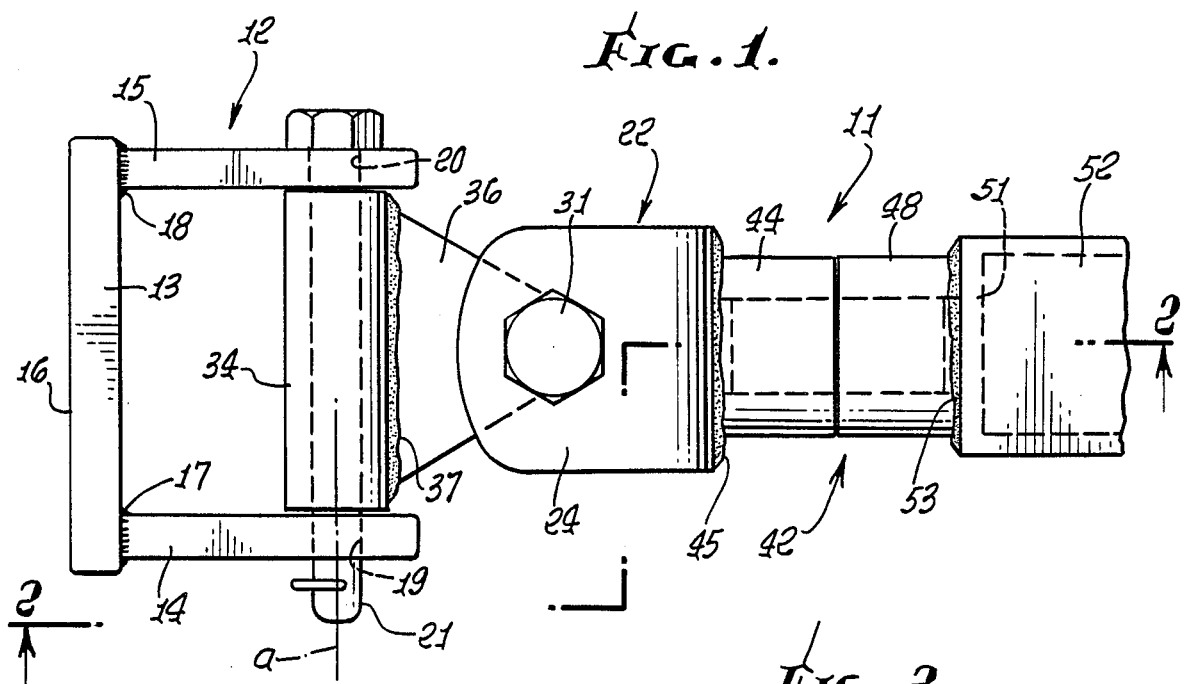
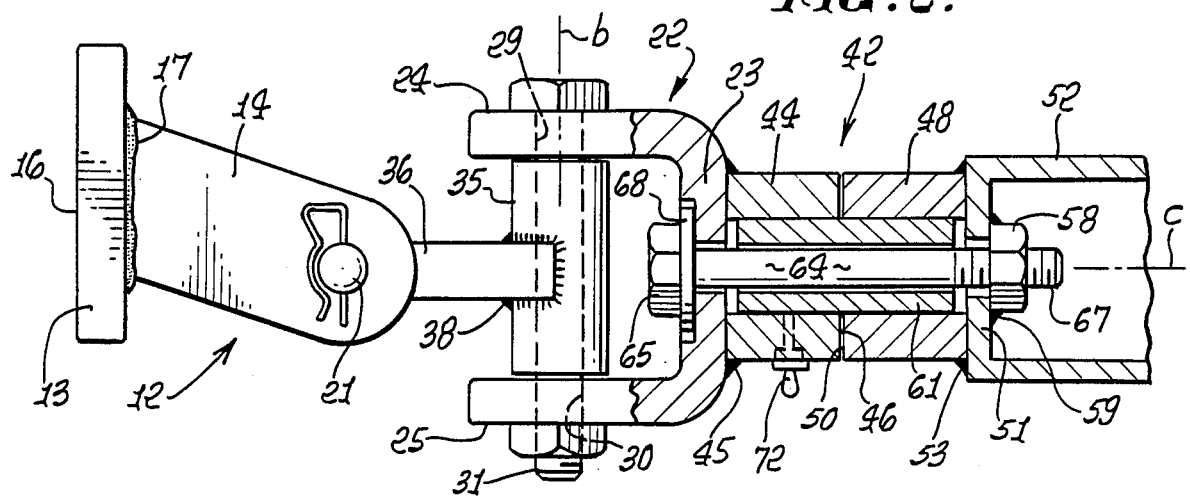
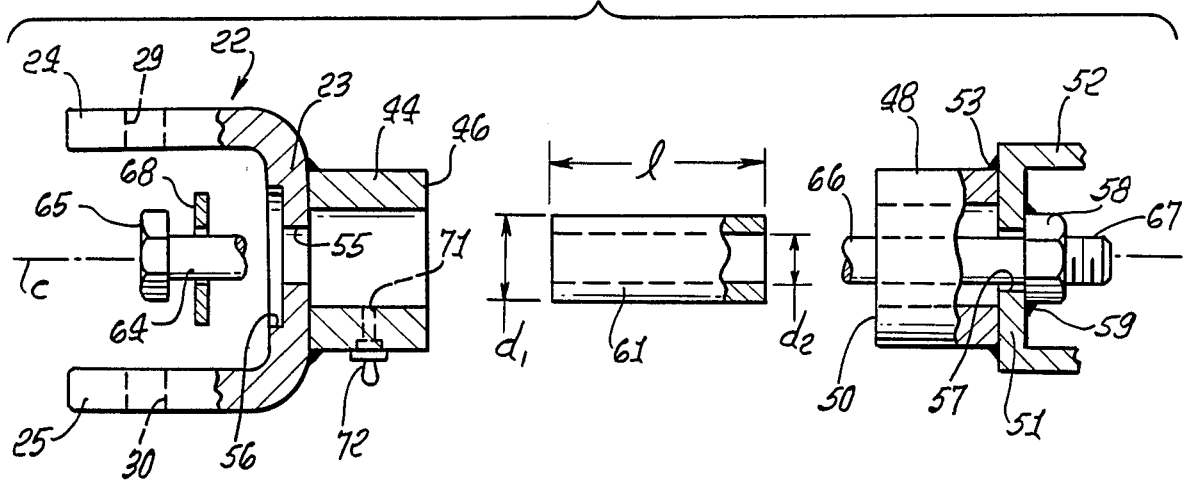

THREE-AXIS TRAILER HITCH HAVING IMPROVED ROTATABLE COUPLING BETWEEN VEHICLE AND TRAILER

BACKGROUND OF THE INVENTION

The present invention relates to trailer hitches, and, in particular, to a three-axis trailer hitch having an improved rotatable coupling about a longitudinal axis extending between the towing vehicle and the trailer.

Trailer hitches providing mechanical coupling about three independent axes between a towing vehicle and a trailer are known in the art. One representative example is disclosed in U.S. Pat. No. 2,133,065. The trailer hitch disclosed in this patent employs a universal joint or coupling providing limited angular movement about a first or transverse axis and about a second or vertical axis. Rotatable coupling about a third or longitudinal axis is achieved by a longitudinally extending, internally tapered socket member attached to the universal joint. The internally tapered socket member receives the forward end of an externally tapered pintle, the rear end portion of the pintle being securely connected to the trailer. The tapered forward end of the pintle is rotatably secured within the internally tapered socket member by a slidable locking pin or bolt. The trailer is disconnected from the universal joint by manually releasing the slidable locking pin and withdrawing the tapered pintle from its mating socket.

It is a principal object of the present invention to provide a strong, safe, and simple trailer hitch having improved rotational coupling about the longitudinal axis extending between the towing vehicle and the trailer.

It is another object to provide a trailer hitch having a tightly coupled rotatable joint of low friction.

An additional object is to provide a trailer hitch requiring a relatively simple adjustment to compensate for any wear of the abutting parts of the rotatable joint.

The above objects of and the brief introduction to the present invention will be more fully understood, and further objects and advantages will become apparent, from a study of the following detailed description in connection with the drawings.

BRIEF DESCRIPTION OF THE DRAWINGS

FIG. 1 is a top view of the improved trailer hitch of the invention.

FIG. 2 is a side, sectional view of the improved trailer hitch with the section taken along the lines 2—2 of FIG. 1.

FIG. 3 is a side, exploded view of the rotatable coupling of the improved trailer hitch.

DESCRIPTION OF THE INVENTION

Referring to FIGS. 1, 2 and 3, the improved trailer hitch 11 includes a first U-shaped yoke member 12 having a flat rectangular base plate 13 and a pair of spaced-apart, left and right arms 14 and 15. the front or forward face 16 of base plate 13 is attachable to the towing vehicle by bolting, clamping, or other suitable means (not shown). Left and right arms 14 and 15 extend in a rearward direction and are securely attached to base plate 13 by welds 17 and 18. A pair of centrally aligned holes 19 and 20 extend through the left and right arms 14 and 15, respectively, for supporting a first bolt or hinge pin 21. Yoke member 12 may be constructed of strong steel plate for carrying the forces to which the trailer hitch may be subjected.

A second U-shaped yoke member 22 comprises a base 23 and a pair of spaced-apart, upper and lower arms 24 and 25. Arms 24 and 25 extend from base 23 in a forward direction and are provided with a pair of centrally aligned holes 29 and 30, respectively, for supporting a second bolt or hinge pin 31. U-shaped yoke member 22 may be formed of steel and shaped, as by bending, as shown in FIGS. 2 and 3.

A first hollow, cylindrical section or tube 34, dimensioned to fit snugly between the left and right arms 14, 15 of yoke member 12, is angularly supported upon the first hinge pin 21. A second hollow, cylindrical section or tube 35, dimensioned to fit snugly between the upper and lower arms 24, 25 of yoke member 22 is angularly supported upon second bolt 31. First and second cylindrical sections 34 and 35 are spaced apart from each other, and their longitudinal axes are perpendicular, one relative to the other.

A flat, trapazoidally shaped web member 36 extends between cylindrical sections 34 and 35, as shown in FIGS. 1 and 2. The forward end of web member 36 is securely joined to the outside surface of cylindrical section 34 by weld 37. The rear end of web member 36 is joined to the outside surface of cylindrical section 35 by weld 38. The first and second cylindrical sections 34 and 35, along with web member 36, provide the mechanical intercoupling between yoke members 12 and 22. These joined cylindrical sections 34 nd 35 are referred to as the cross in one representative type of universal coupling.

The first and second U-shaped yoke members 12 and 22, together with intercoupled cylindrical sections 34 and 35, constitute a universal coupling for providing limited angular motion of cylindrical section 34, along with the yoke member 22, about a first or transverse axis a—a extending through the center of hinge pin 21, as seen in FIG. 1. Axis a—a may be considered transverse to or perpendicular to the direction of travel of the towing vehicle. Limited angular motion of second U-shaped yoke member 22, relative to cylindrical section 35 and first U-shaped yoke member 12, is achieved about a second or vertical axis b—b extending through the center of bolt 31, as seen in FIG. 2. Axis b—b may be considered vertical and is substantially perpendicular to axis a—a.

Rotatable coupling about a third or longitudinal axis c—c is provided by the improved rotatable joint 42. Rotatable joint 42 includes a first, short, hollow cylindrical member 44 having a forward end securely attached to the rear surface of base 23 of yoke member 22 by weld 45. Hollow, cylindrical member 44 is provided with a smooth, flat rear-end surface 46 perpendicular to the longitudinal axis of hollow, cylindrical member 44, as best seen in FIG. 3. A second, short, hollow cylindrical member 48 is provided with a smooth, flat front-end surface 50 perpendicular to the longitudinal axis of hollow cylindrical member 48. The rear end of second, short, hollow cylindrical member 48 is securely attached to front-end plate 51 of a square, hollow housing 52 by weld 53. The square housing 52 may be part of the tongue of a trailer or it maybe a housing into which the tongue of a trailer may be securely attached. Frontend plate 51 of housing 52 lies in a plane perpendicular to the longitudinal axis of hollow cylindrical member 48.

A circular hole 55 extends through the central portion of base 23 of yoke member 22, as seen in FIGS. 2 and 3. Hole 55 is coaxially aligned with the longitudinal axis of hollow cylindrical member 44. The inside, or forward portion of base 23 of U-shaped yoke member 22 is counter-bored to provide a short, circular recess 56 coaxially surrounding hole 55. Recess 56 has a smooth, flat bottom providing a bearing surface, as will be explained hereinafter.

A circular hole 57 extends through the central portion of front-end plate 51 of hollow, square housing 52, as seen in FIGS. 2 and 3. Hole 57 is coaxially aligned with the longitudinal axis of hollow cylindrical member 48. The rear surface of end plate 51 supports a self-locking nut 58, the axis of which is coaxially aligned with the longitudinal axis of hollow cylindrical member 48. Locking nut 58 is securely attached to the rear surface of end plate 51 by weld 59.

The first and second short, hollow cylindrical members 44 and 48 have relatively thick walls, and the smooth, flat rear-end surface 46 of member 44 provides a first bearing face. The smooth, flat front-end surface 50 of member 48 provides a second bearing face for abutment with the bearing face of rear-end surface 46.

The inner cylindrical wall surfaces of first and second short, hollow cylindrical members 44 and 48 are smooth and uniform for providing a cylindrical bore. A hollow, cylindrical sleeve member 61 is coaxially positioned within this cylindrical bore formed by the abutting first and second short, hollow cylindrical members 44 and 45. The outer diameter $d_1$ of sleeve member 61 is slightly less than the diameter of the cylindrical bore and the length 1 of sleeve member 61 is less than the total length of the first and second cylindrical members 44 and 48. Accordingly, the spacing between the rear surface of base 23 of yoke member 22 and the front surface of end plate 51 is greater than the length 1 of sleeve member 61. Hollow cylindrical sleeve member 61 is formed of hardened steel and its outside cylindrical surface is smooth and uniform.

Rotatable joint 42 is held together by long bolt 64 having a head 65 at one end, a smooth central shank portion 66 and a threaded end portion 67. Surrounding the smooth shank portion of bolt 64 adjacent head 65 is a hardened steel flat washer 68. Long bolt 64 extends through circular hole 55 in base 23 of yoke member 22, through the center of sleeve member 61, and through circular hole 57 in front-end plate 51, to threadably engage self-locking nut 58. Hardened, flat steel washer 68 fits within the circular recess 56 in base 23 and serves as a bearing surface between head 65 and the smooth, flat bottom of recess 56.

The diameter of shank portion 66 of long bolt 64 is somewhat less than the inside diameter $d_2$ of sleeve member 61. This provides ample clearance between shank portion 66 and sleeve member 61 for reasons that will be explained below.

By properly torqueing long bolt 64, the abutting faces of surfaces 46 and 50 of cylindrical members 44 and 48 are brought together, as shown in FIGS. 1 and 2, to achieve rotatable joint 42. As may be seen in the sectional view of FIG. 2, clearance space exists at each end of sleeve member 61 by virtue of the shorter length of the sleeve member relative to the distance between base 23 and end plate 51. This clearance space is adapted for receiving lubrication (not shown) such as heavy grease. The clearance between smooth, shank portion 66 of long bolt 64 and the inner cylindrical wall surface of sleeve member 61 also receives and holds lubrication. The outer cylindrical surface of sleeve member 61 and the cylindrical bore formed by the inner cylindrical wall surfaces of hollow cylindrical members 44 and 48 are likewise lubricated, as are the abutting faces of flat end surfaces 46 and 50. By virtue of the dimensions of sleeve member 61, all of its surfaces and ends are coated with lubrication.

The clearance between the smooth, shank portion 66 adjacent head 65 and the circular hole 55 in base 23 allows lubrication to reach recess 56 and flat washer 68. The clearance between shank portion 66 and the hole through the center of flat washer 68 provides a path for lubrication to reach the underside of head 65 of long bolt 64.

It is important to note that sleeve member 61, with all of its surfaces coated with lubrication, is free to slide longitudinally forward or rearward by a small amount, or to rotate or not rotate, depending upon the forces acting upon it. The tension force on long bolt 64 does not have to be large to retain the lubricated faces of end surfaces 46 and 50 in rotating abutment. A smooth and tight-fitting rotational joint 42 is achieved for rotation of trailer housing 52 relative to yoke member 22 about the longitudinal axis c—c.

While lubrication of long bolt 64, sleeve member 61, flat washer 68, the cylindrical bore of cylindrical members 44 and 48, along with abutting surfaces 46 and 50, is provided prior to final assembly of rotatable joint 42, lubrication may be supplied after assembly or after the trailer hitch has been in service by means of a small radially extending hole or passageway 71 extending from the outside cylindrical surface of cylindrical member 44 through the wall into the cylindrical bore. A conventional grease fitting 72 is threadably inserted into passageway 71 to enable grease, under pressure, to be forced into rotatable joint 42.

Since the threaded end 67 of long bolt 64 is securely held within lock nut 58, and lock nut 58 is securely held within trailer housing 52 by weld 59, any rotation of housing 52 about longitudinal axis c—c will cause long bolt 64 to rotate in unison therewith. Accordingly, long bolt 64, along with head 65, with rotate relative to cylindrical member 44, its flat end surface 46, and the recess 56 in base 23 of yoke member 22. Both flat washer 68 and sleeve member 61 provide lubricated bearing surfaces, along with the lubricated bearing faces of flat surfaces 46 and 50, to reduce friction and minimize wear.

An important feature of rotatable coupling 42 is achieved by providing a greater clearance between the outer cylindrical surface of smooth, shank portion 66 and the inner cylindrical surface of sleeve member 61 than is provided between the outer cylindrical surface of sleeve member 61 and the inner cylindrical surfaces of hollow cylindrical members 44 and 48 forming the cylindrical bore within which sleeve member 61 is situated. This feature, simply stated, allows sleeve member 61 to carry substantially all of the bending forces existing between cylindrical members 44 and 48. Such bending forces would be caused, for example, by the load of the trailer acting upon the tongue housing 52 and, therefore, upon the abutting faces of flat surfaces 46 and 50. Such bending force also may be produced in the event swaying of the trailer with respect to the vehicle occurs during towing. This feature relieves, to a large extent, bending forces that otherwise might be transferred to long bolt 64. In choosing the length 1 of sleeve member 61 to be less than the total length of hollow cylindrical members 44 and 48, no forces in either tension or in compression will be acting upon sleeve member 61.

The degree of tightness of rotatable joint 42 between the abutting faces of flat surfaces 46 and 50 is readily adjusted by simply turning long bolt 64 within locking nut 58. Frictional wear, occuring during normal service use, whether upon the abutting faces of surfaces 46 and 50 or upon the flat surfaces of washer 68 or upon the underside of head 65 of long bolt 64, may be compensated for by simply tightening long bolt 64 to produce the degree of rotational tightness desired.

Sleeve member 61 provides the important functions of maintaining coaxial alignment of hollow cylindrical members 44 and 48; providing a smooth external lubricated bearing surface for the cylindrical bore of hollow cylindrical members 44 and 48; carrying the bending force imparted upon the joint; and serving as a reservoir to retain and direct lubrication to the moving parts to achieve improved rotatable coupling in the three-axis trailer hitch of the invention.

Since many changes may b made in the above-described apparatus and many different embodiments of this invention could be made without departing from the scope thereof, it is intended that all matter contained in the above description or shown in the accompanying drawings shall be interpreted as illustrative and not in a limiting sense.

What is claimed is:

1. A trailer hitch for providing coupling about three independent axes between a towing vehicle and a trailer, comprising in combination:
   (a) a universal coupling having a first U-shaped yoke member, a second U-shaped yoke member, and a pair of hollow cylindrical sections joined together in the form of a cross, said first U-shaped yoke member having a base plate adapted for attachment to the towing vehicle and a pair of spaced-apart, parallel arms extending from said base plate for supporting one of said pair of joined hollow cylindrical sections for limited angular movement about a first axis; said second U-shaped yoke having a base portion and having a pair of spaced-apart, parallel arms extending from said base portion for supporting the other of said pair of joined hollow cylindrical sections for angular movement about a second axis inclined ninety degrees with respect to said first axis;
   (b) a first, short, hollow cylindrical member having a forward end portion securely joined to the base portion of said second U-shaped yoke member, said first, short, hollow cylindrical member extending from the base portion in a direction opposite to that of the pair of spaced-apart, parallel arms; said first, short, hollow cylindrical member having a smooth rear-end surface perpendicular to the longitudinal axis of said first, short, hollow cylindrical member;
   (c) a second, short, hollow cylindrical member having a smooth front-end surface perpendicular to the longitudinal axis of said second, short, hollow cylindrical member, said second, short, hollow cylindrical member having a rear-end portion adapted for secure attachment to a trailer; each of said first and second short, hollow cylindrical members having a smooth cylindrical inner wall surface forming a bore;
   (d) a hollow, cylindrical sleeve member coaxially positioned within and extending between said first and second short, hollow cylindrical members, said hollow, cylindrical sleeve member having a diameter slightly less than the diameter of the bores of said first and second short, hollow cylindrical members, and a length less than the total length of said first and second short, hollow cylindrical members; and
   (e) a bolt having a head at one end and a threaded portion at its opposite end, said bolt extending axially between the opposite ends of said first and second short, hollow cylindrical members and through the center of said hollow, cylindrical sleeve member to retain the smooth rear-end surface of said first short, hollow cylindrical member in abutment with the smooth front-end surface of said second short, hollow cylindrical member; said hollow, cylindrical sleeve member maintaining axial alignment between said first and second short, hollow cylindrical members and providing a smooth bearing surface for relative rotation of said first short, hollow cylindrical member with respect to said second short, hollow cylindrical member about a longitudinal axis perpendicular to said second axis.

2. The trailer hitch as defined by claim 1 wherein the base portion of said second U-shaped yoke member is provided with a centrally located, circular hole, said centrally located, circular hole being coaxially aligned with the longitudinal axis of said first short, hollow cylindrical member; and wherein said bolt extending axially between the opposite ends of said first and second short, hollow cylindrical members and through the center of said hollow, cylindrical sleeve member also extends through said centrally located, circular hole.

3. The trailer hitch as defined by claim 1 wherein the base portion of said second U-shaped yoke member is provided with a centrally located, recessed circular hole, said centrally located, recessed circular hole being coaxially aligned with the longitudinal axis of said first short, hollow, cylindrical member; a thin flat washer, said thin flat washer being mounted upon said bolt adjacent said head; said bolt extending axially between the opposite end of said first and second short, hollow cylindrical members and through the center of said hollow, cylindrical sleeve member also extends through said centrally located, recessed circular hole, said thin flat washer mounted adjacent said head being situated within said recessed circular hole.

4. The trailer hitch as defined by claim 1 wherein said bolt has a smooth, shank portion extending from said head to said threaded end portion, and wherein the diameter of said smooth, shank portion is less than the inner diameter of said hollow, cylindrical sleeve member, whereby said hollow, cylindrical sleeve member is adapted to carry any bending forces that may be imparted upon said abutting first and second short, hollow, cylindrical members.

5. The trailer hitch as defined by claim 1 further comprising a small hole radially extending from the outer cylindrical surface of said first short, hollow cylindrical member and through the wall of said first hollow, cylindrical member to the bore therein; said small, radially extending hole serving as a passageway for conveying lubrication to said hollow, cylindrical sleeve member and to said bolt.

6. A trailer hitch for providing coupling about at least two independent axes between a towing vehicle and a trailer, comprising in combination:

(a) a U-shaped yoke member having a base portion and a pair of spaced-apart arms extending from said base portion, said pair of spaced-apart arms being adapted for receiving a hinge pin about which said U-shaped yoke member may be angularly positioned about a first axis, said hinge pin being mechanically supported with respect to a towing vehicle;

(b) a first short, hollow cylindrical member having a forward end portion securely joined to the base portion of said U-shaped yoke member, said first short, hollow cylindrical member extending from the base portion in a direction opposite to that of the pair of spaced-apart arms; said first short, hollow cylindrical member having a smooth rear-end surface perpendicular to the longitudinal axis of said first short, hollow cylindrical member;

(c) a second short, hollow cylindrical member having a smooth front-end surface perpendicular to the longitudinal axis of said second short, hollow cylindrical member; said second short, hollow cylindrical member having a rear-end portion adapted for secure attachment to a trailer; each of said first and second short, hollow cylindridal members having a smooth cylindrical inner wall surface forming a bore;

(d) a hollow, cylindrical sleeve member coaxially positioned within and extending between said first and second short, hollow cylindrical members; said hollow, cylindrical sleeve member having a diameter slightly less than the diameter of the bores of said first and second short, hollow cylindrical members, and a length less than the total length of said first and second short, hollow cylindrical members; and (e) a bolt having a head at one end and a threaded portion at its opposite end, said bolt extending axially between the opposite ends of said first and second short, hollow cylindrical members and through the center of said hollow, cylindrical sleeve member to retain the smooth rear-end surface of said first short, hollow cylindrical member in abutment with the smooth front-end surface of said second short, hollow cylindrical member; said hollow, cylindrical sleeve member maintaining axial alignment between said first and second short, hollow cylindrical members and providing a smooth bearing surface for relative rotation of said first short, hollow cylindrical member with respect to said second short, hollow cylindrical member about a longitudinal axis perpendicular to said first axis.

* * * * *